United States Patent [19]

Comeau

[11] 4,402,373
[45] Sep. 6, 1983

[54] BLOOD LOSS ANALYZER

[76] Inventor: Perry J. Comeau, R.R. 3 Valley Dr., Searcy, Ark. 72143

[21] Appl. No.: 342,940

[22] Filed: Jan. 26, 1982

[51] Int. Cl.³ .......................................... G01G 11/18
[52] U.S. Cl. ....................................... 177/1; 128/771; 177/15; 364/416
[58] Field of Search .......... 177/1, 15, 25, 45, DIG. 3; 128/771, 132 D; 364/416; 73/432 G; 604/246

[56] References Cited

U.S. PATENT DOCUMENTS

| 2,707,955 | 5/1955 | Borden | 604/246 |
| 4,294,320 | 10/1981 | Bilstad | 177/1 |
| 4,295,537 | 10/1981 | McAuinn | 177/15 |

Primary Examiner—Joseph W. Hartary
Attorney, Agent, or Firm—Head, Johnson & Stevenson

[57] ABSTRACT

An apparatus for measuring the true loss of blood from a patient during a surgical operation, comprises a blood container on a weighing means, that provides an output signal equal to the total weight on the weighing means. A weight register is maintained, to be updated periodically to the output of the weighing means. At scheduled periodic times the new weight reading of the weighing means is compared to the previous weight as indicated by the weight register. Any difference, if positive, indicates additional input to the blood container on the weighing means. This positive difference goes to update the weight register, and also to update a blood register indicating total blood loss. If the difference between the new electrical weight signal and the previous (old) electrical weight signal is negative, then an equal number of units is withdrawn from the weight register, to bring it into agreement with the new weight on the weighing means.

14 Claims, 4 Drawing Figures

BLOOD LOSS ANALYZER

BACKGROUND OF THE INVENTION

1. Field of the Invention

This invention lies in the field of medical surgery performed on patients. It involves the important capability of determining the total blood loss from the patient during a surgical operation. More particularly it involves an instrument which can respond to the increasing weight of a container into which blood is pumped from a cavity in a patient. It also involves the weighing of surgical sponges, so that the total blood content of the sponges as they are placed in a container on a weighing machine can be determined, by determining what part of an increase in weight is blood and what part is added tare.

2. Description of the Prior Art

In the prior art various means have been described for measuring the total blood loss for a patient. One is to weigh the total blood extracted by a vacuum pump from a body cavity; another way is to estimate the weight of blood on each sponge, and to sum this number for each of the known number of sponges. There are other chemical methods of determining the amount of blood in the sponges for example, but have possible errors due to the possible presence of other electrolytes in the blood, and so on.

There is also another important factor which is not taken into account by any of the prior art known to me. This is the fact that there is a very considerable evaporation of blood during the operation from the containers that hold the waste blood. As a general operating practice the operating room is quite cool, and of course the blood is at body temperature, and the amount of blood loss by evaporation can be quite considerable.

SUMMARY OF THE INVENTION

It is a primary object of this invention to provide a blood loss analyzer which accounts for the blood withdrawn from a patient's body during a surgical operation, both by means of vacuum pumps evacuating blood from body cavities, and also the measurement of blood content of sponges.

It is a further object of this invention to provide a means for precisely accounting for the amount of blood loss by evaporation, following the time at which it is removed from the body, until the end of the operation.

Blood is removed from the body by two means. One is by vacuum pump from the body cavities, which goes into a container on a weighing means or scale. The other is by gauze sponges. These sponges are available in several different sizes. However, the dry weight (that is, the weight without blood) of each type is known. It is common practice to keep a careful record of the number of each size of sponge used.

Apparatus for integrating the amount of blood pumped from the body is inherently simpler than keeping a record of the blood on the sponges, since in the case of sponges the tare weight increases with each sponge added to the container, whereas in the case of pumped blood, the tare weight on the scale is constant.

The purpose of this apparatus is to continuously display the amount of blood loss, and to sound an alarm when the indicated blood loss reaches a value which is the maximum weight of blood that can safely be withdrawn from the patient.

These and other objects are realized and the limitations of the prior art are overcome in this invention by utilizing a method of weighing a container into which blood is continually introduced either in liquid form as droplets or in the form of blood soaked gauze sponges. Electrical signals from a weighing means or scale are periodically checked. If the latest weighing signal is higher than the previous one, that would mean that blood has been entered into the container, and this is reported to a blood register or totalizer which keeps account of the increase in blood measured by the scales.

On the other hand if the new reading of the weighing signal, or the new electrical weighing signal (NEWS) is less than the previous or old electrical weighing signal (OEWS), then it means that some weight of blood has been lost by evaporation from the container. This in effect sets a new tare which is the combined weight of container plus contents as of the last measurement of the weighing signal. This is the output of the weight register.

The second register provides the total weight of blood in the container measured at the time of entry (before evaporation can take place). This is the true blood loss register, or blood register. When the NEWS and OEWS are compared, if the difference is positive, that is, if NEWS is larger than OEWS, the difference is positive, and this incremental weight is added to the blood register (BR). It is also added to the weight register (WR) to update it to the NEWS.

When the NEWS is less than the OEWS, the result of the comparison or subtraction is negative. This negative signal causes an equal number to be withdrawn from the weight register, to update the OEWS to the NEWS. This negative difference does not affect the blood register reading.

The total indicated in the blood register would be the total blood removed from the patient. When this amount equals a preselected total weight of blood an alarm is sounded to inform the staff. When the blood is collected in a container from a vacuum pump for example and the tare of the weighing system is constant all that is required to consider the increase and decrease of weight, as added blood or as evaporated blood.

In the case of the gauze sponges, there is another factor, which is the added weight of a dry sponge, that is, the weight of a sponge prior to its use to absorb blood. In other words the weighing means that carries the container into which the sponges are placed has an increasing tare and this must be accounted for. When the NEWS is greater than the OEWS, this increase updates the WR. It also adds to the BR. However, since part of this added weight is tare, the added tare corresponding to weight of dry sponge must be subtracted from the BR.

BRIEF DESCRIPTION OF THE DRAWINGS

These and other objects and advantages of this invention and a better understanding of the principles and details of the invention will be evident from the following description taken in conjunction with the appended drawings in which:

FIG. 2 illustrates, in the apparatus of FIGS. 1 and 3, how the effect of evaporation can be accounted for.

DESCRIPTION OF THE PREFERRED EMBODIMENT

It is a very important requirement in a surgical operating room, to provide a positive, accurate record of the number of gauze sponges that are used, and to indicate also whether they are of one or another type of sponge, each of which has a different tare or dry weight. In the surgical operation, blood is absorbed from the open wound by sponges of gauze disposed in the critical areas of the surgery. When these are removed a considerable amount of blood collected in the gauze becomes coagulated making a volumetric determination of the blood a difficult problem. In a typical operating room situation, these sponges are laid out on a plastic sheet for observation and the volume of blood is estimated by the medical personnel.

Such a procedure allows considerable margin for error since only a few operating room personnel can, with any accuracy at all, visualize a sponge and calculate the amount of blood within 5 cc. Errors of estimation can be as much as 5 to 10 cc of blood per sponge by this method of estimating. Of course, in a small child or infant this amount of blood loss may represent a significant percentage of total blood volume, and a much more accurate estimate requires more precise methods of measurement. In infants the volume loss of approximately 90 to 120 cc represents 30 to 40% of total blood volume, and loss of this amount can be quite serious to the child.

Figure 1:
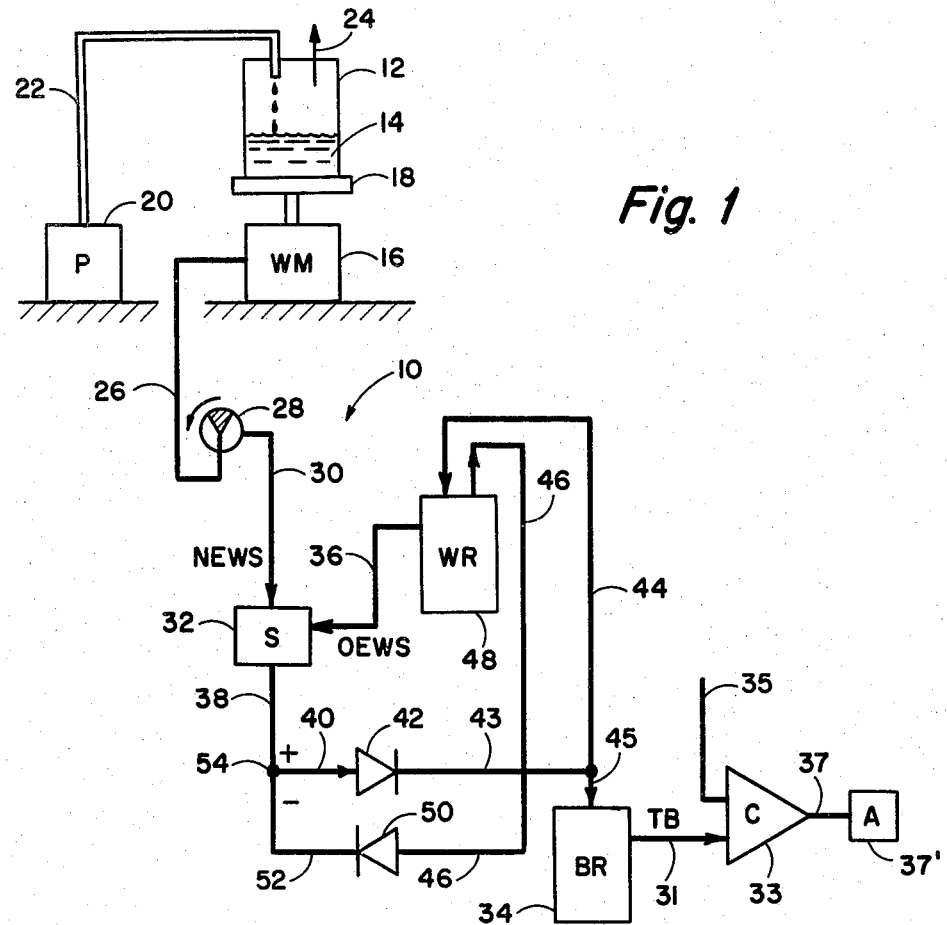
FIG. 1 illustrates an apparatus for measuring the loss of blood from a patient where the blood is removed from a cavity in the body by means of a vacuum pump and placed in a container on a weighing machine.

Referring now to the drawings, and in particular to FIG. 1, there is shown in schematic fashion one embodiment of this apparatus indicated generally by the numeral 10. A weighing means or scale 16 is provided with a weighing pan 18 on which can be placed a container 12 for containing the blood or other liquid 14. Means such as the pump 20 pumps blood from a body cavity, and delivers it by means of pipe 22 to the container 12 so that the level of liquid 14 is continually changing. Consequently the electrical weighing signal (EWS) on line 26 (which is preferably an electrical digital signal), indicate the instantaneous total weight of the container plus contents on the weighing pan 18.

If this liquid is a vaporizable liquid, and has sufficient vapor pressure, there will be more or less evaporation from the surface of liquid 14, and the vapor will flow in accordance with arrow 24, out of the top of the container 12. Thus, the electrical weighing signal on 26, can either move upwardly or downwardly from one reading to another, depending on whether blood is added in which case the weight will increase, and if blood is not added the weight will decrease, as a result of evaporation.

There is a blood register or totalizer 34, and a weight register 48. Both registers will account for the amounts of blood entered into the container 12, and also the amount of blood evaporated, from the container during the total process. A contact means 28, which can be electronic, or mechanical, as shown, in which a contact is rotated at a selected speed and closes the switch periodically at a selected time interval. This periodic contact joins the output leads 26 from the weighing means, and the line 30 which leads to a comparison or subtraction means 32. The other input to the subtraction means on line 36 is the old EWS, as indicated by the weight register 48. The output of the subtraction means 32 is on line 38, and it may be a positive signal or a negative signal. If it is a positive signal it indicates that blood has been added to the container 12 from the pump 20. The signal on line 38 then goes through gate 42 and by leads 40, 43 and 44 as input to the blood register. This additional signal then brings the OEWS of the WR up to a new total equal to the NEWS. The use of the diode symbol 42 indicates that it is a one directional path and operates only when the difference signal on 38 is positive.

At the junction 54 there is another line 52 which is connected to a reversed diode 50. When the electrical signal or difference signal on line 38 is negative, then the proper number is withdrawn from the weight register, through the diode 50 and line 52 back to the subtraction means 32. In other words, an increase between successive NEWS and the previous or OEWS provides a positive signal which goes into the blood register to raise its total. If it is negative it reduces the total in the weight register 48.

Also in FIG. 1 the blood register 34 continually goes by lead 31 to a second comparison means 33, which has two inputs. One input is on line 31 having the total blood weight removed from the patient. Another input by lead 35 carries a signal corresponding to the maximum desired blood loss. The output lead 37 would show the difference. As the operation progresses the signal on 37 decreases to 0 at which time the signal on lead 37 could be used to sound an alarm so as to inform the staff of the situation that the amount of blodd loss has reached the maximum number. The signal of blood loss on line 31 can be displayed by conventional means.

In FIG. 1 is shown one embodiment of a measuring system which will take account of the input of blood, and totalize that number. While many of the features of this circuit are well known such as the simple weighing apparatus and vacuum pump 16 and 20 and counting registers, etc., the important new feature of this circuit has not been shown before. This feature is extremely important and is the ability to recognize the amounts of evaporated blood and to provide the total weight of the container and blood as it was entered into the container.

Figure 2:
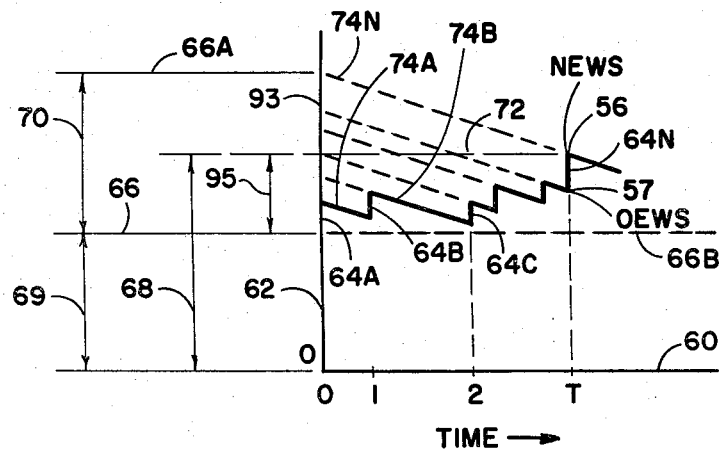

FIG. 2 indicates the relationship between the changing reading of the weight register, and the reading of the BR, being the total amount of blood inserted into the container. The ordinate 66A represents the sum of the original tare weight 69 on the weighing means 16 prior to the start of surgery, and the total 70 of blood inserted into the container during the operation. Starting at time 0 the repetitive scanning of the output leads 26 to obtain the numerical value of the new electric weighing signal shows an increase 64A in the NEWS at time=0. That is shown by the ordinate 64A at the time 0. However, the weight of that amount of blood does not stay constant on the scale and it decreases slowly with time in accordance with the line 74A. Later at time 1 there is another blood flow into the container indicated by 64B and that provides a new total blood into the container which is the sum of the ordinate 64B and 64A which is equal to the intersection between the dashed extension line from 74B back to the ordinate line 93. Again blood is lost by evaporation and so the NEWS reduces with time until time 2 when there is an additional increase in the blood, and so on up to a time T where at point 56 the current reading of the weight register 48, represented by the dimension 68, represents the current value of NEWS.

The vertical level of the line 66A, as represented by the two arrows 69 and 70 represents the total value of tare 69 and total blood input 70. Of course, the current amount of blood in the blood register is not equal to the dimension 70, but is equal to the dimension 95 which is the value of 70 reduced by the evaporation over the time from time=0 to time=T. Thus the arrow 68 represents the current value of NEWS and the point 57 represents the value of OEWS which are continually being compared in the subtraction means 32.

Figure 3:
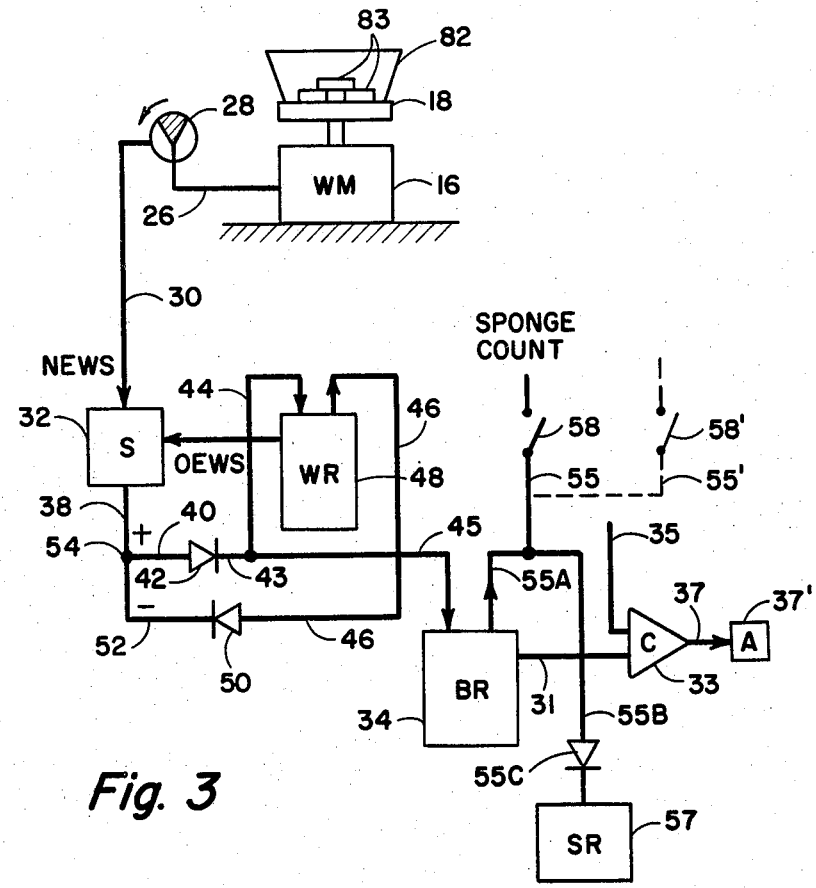
FIG. 3 illustrates a modification of FIG. 1 in which the blood is introduced into a container on a weighing means by being attached to gauze sponges.

Referring now to FIG. 3 there is shown a modification of FIG. 1. This includes the presence of a different container 82 on the weighting means 16 and the addition of a sponge register 57.

The two circuits are similar to the point of the blood register 34. As in the case of FIG. 1, any positive signal on line 38 is carried by lines 40, 43 and 45 to the blood register 34. However, this increase is no longer all blood, part of it is the tare weight of the sponge or sponges 83 added. The weight of the sponges must be subtracted from the BR.

A signal is provided by switch 58 and line 55 each time a sponge 83 is inserted into 82. This signal by line 55A subtracts from the BR a weight equal to the tare of one sponge. Also on line 55B it adds 1 to the number of sponges in the sponge register 58. Thus the increase in weight registered on the BR is corrected by removing the weight of the sponge.

As in FIG. 1, the current reading of the BR can go by line 31 to the comparator 33, where the weight of blood is continuously compared to the maximum value on line 35 to provide an output 37. When the difference signal on 37 reaches zero an alarm 37' can be sounded.

As previously mentioned there are slight variations between FIGS. 1 and 3, due mainly to the type of containers. That is, one container holds only blood, and the other also holds gauze sponges. However, they both take full account of the evaporation of the liquid.

Of course, two separate circuits can be used, one for each type of container. However, by totalling the weights on multiple scales as in FIG. 4 and using a circuit like FIG. 3, the totalizing of blood from various containers can be done with one circuit.

Figure 4:
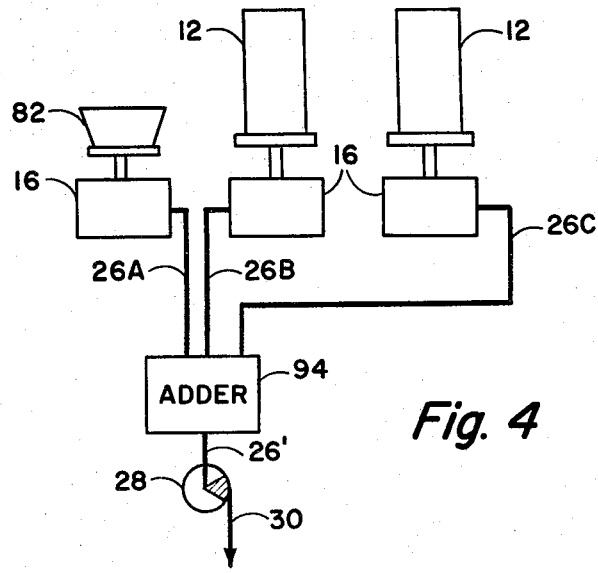
FIG. 4 illustrates a system with more than one blood receptacle.

In FIG. 4 there are shown three weighing means 16, one with a sponge container 82, and the others with blood containers 12. The outputs of the weighing means, in the form of binary numbers are added over lines 26A, 26B, 26C, to a conventional digital adder 94. The output of the adder then goes by lead 26' to the timing switch 28, and by line 30 to the subtractor 32 of FIG. 3.

The operation is the same as was previously described in connection with FIG. 3. Also shown in FIG. 3, by dashed line a second line 55' and switch 58', for subtracting from the blood register 34 and adding to the sponge register 57, the weights and number of sponges of a different style from those indicated by line 55 and switch 58.

What has been shown is a system and method for accurately accounting for blood loss from a patient while in surgery, whether the blood is in the form of a free liquid, or as blood soaked gauze sponges. The instrumentation also accounts for the loss of liquid by evaporation from the time the blood is placed in the container until the end of the operation.

While the invention has been described as an apparatus for measuring blood withdrawn from a surgical patient, it can of course be used for measuring the total intermittent flow of any vaporizable liquid. Therefor, the description in terms of blood is only for purposes of illustration and not by way of limitation.

It will be clear that the circuits shown in FIG. 1 and FIG. 3 are purely schematic, and are designed to illustrate the principle factors involved in the apparatus, and in the process, by which the total blood loss is accounted for, at all times during the surgical operation. There are of course many other forms in which this apparatus could be built including one in which the signal handling means such as the comparison or subtraction means and the various register means are all part of a small computer system which can be programmed to do the separate operations. However, it will be clear that the programmed computer is no more than the total of the physical apparatus and circuits illustrated in the drawings, except that it is more flexible, in the sense that changes can be made in the process by programming the computer, rather than by changing circuit elements.

While I have described a principle of the invention of a blood loss analyzer I have only described in detail the essential portions of it which have to do with the precise measurement of each incremental addition or loss of blood from a physical container, or containers. A normal surgical apparatus which would be installed in an operating room would include not only FIG. 3 but one or more of FIG. 1, plus other small operating devices such as totalizers, alarms and display means and so forth. Since these are all conventional and well known in the art, they need not be further described and therefore the separate instrumentation such as in FIGS. 1 and 3 would be summed.

The apparatus as described herein employing scale 16 having weighing pan 18 thereon may be used independently of its function in the blood loss analyzer. This item of equipment may very easily be employed as a common weighing scale for use in the hospital operating room or in a pathology laboratory. Scale 16 is particularly useful for weighing pathology specimens when received from the patient and in weighing the specimens prior to preservatives being added. This ability is easily achieved by providing a separate weigh mode which may be accomplished by a separate switch in the blood loss analyzer circuitry. Thus the equipment making up the blood loss analyzer has other useful applications.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. Apparatus for determining the total weight of a vaporizable liquid being incrementally placed in a selected container over a selected period of time, comprising;

(a) a first selected container mounted on a weighing means, the output of said weighing means being a continuing electrical signal indicative of the weight of container and contents, at any selected time;
(b) a comparator/subtractor means having a first intermittent input of the new electrical weighing signal (NEWS) from said weighing means;
(c) a weight register (WR) means for continuously outputting an electrical signal equal to the old electrical weighing signal (OEWS), the same being the value of NEWS at the time of the previous intermittent measurement; the output of said WR being the second input to said comparator/subtractor means;
(d) if said NEWS is greater than said OEWS, the output of said comparator/subtractor will be positive, (indicative of added liquid) and including means responsive to said positive signal to augment the reading of said WR; and means to augment the total in a liquid register (LR) by the amount of said positive signal; and
(e) if said NEWS is less than said OEWS, the difference signal will be negative (indicative of a loss of liquid by vaporization), and including means responsive to said negative signal to cause an equal weight to be withdrawn from said WR.

2. The apparatus as in claim 1 in which said vaporizable liquid is blood, and said liquid register is a blood register.

3. The apparatus as in claim 2 including means to display the signal on the output of said blood register.

4. The apparatus as in claim 2 including second comparison means, with one input connected to the output of said blood register, and a second input equal to a selected maximum value of liquid weight.

5. The apparatus as in claim 4 including alarm means responsive to the output signal of said second comparison means.

6. The apparatus as in claim 2 and including means to add blood soaked sponges to said container; and
(a) input circuit means for applying a first selected electrical signal to reduce the total in said blood register, indicative of the weight of a first style of sponge; and
(c) means for adding said first selected signal to a sponge register for counting the number of sponges placed in said container.

7. The apparatus as in claim 6 and including means for applying a second selected signal to said blood register to reduce the total therein, indicative of the tare weight of a second style of sponge.

8. The apparatus as in claim 6 including
(a) at least a second selected container and weighing means, said second weighing means having an EWS indicative of the weight of said second container and contents;
(b) adder means to add said first and second EWS to provide a total EWS; and
(c) means to apply the output of said adder means through switch means to said comparator/subtractor means.

9. The apparatus as in claim 1 including at least a second weighing means and a second container for receiving said liquid, and including
(a) means to add the two electric weighing signals from said at least two weighing means to provide a sum electrical weighing signal (sum EWS) and
(b) means to intermittently apply said sum EWS to said comparator/subtractor means.

10. Method for determining the total weight of a vaporizable liquid being injected incrementally into a container; comprising the steps of;
(a) weighing said container plus contents, and providing an electrical weighing signal (EWS) corresponding to the weight of said container and contents; and applying said EWS to a weight register, whereby the total in said weight register is equal to said EWS;
(b) determining at successive selected time intervals a EWS (NEWS)
(c) subtracting from said NEWS the value of old EWS (OEWS) in said weight register; to provide a difference signal;
(d) if said difference signal is positive, adding said positive difference signal to augment the reading of said weight register; and adding said positive difference signal to a liquid register;
(e) if said difference signal is negative, subtracting said negative difference signal from the total in said weight register.

11. The method as in claim 10 in which there are at least two weighing means and corresponding containers; and including the additional steps of;
(a) adding the two EWS from each of said at least two weighing means to provide a sum EWS; and
(b) intermittently applying said sum EWS to said comparator/subtractor means.

12. The method as in claim 11 in which said liquid is blood, and including the additional steps of;
(f) intermittently placing in said container a series of separate sponges of a selected type;
(g) generating a first electrical signal corresponding to the tare weight of each of said sponges;
(h) responsive to each of said first electrical signals, subtracting from said blood register a weight corresponding to the tare weight of a sponge.

13. The method as in claim 12 including a sponge register, and responsive to said first electrical signals, augmenting the weight registered in said sponge register by the weight of each sponge.

14. The method as in claim 13 in which there are at least two different styles of sponges, and including the additional steps of;
(a) generating a second electrical signal corresponding to the tare weight of said sponges of said second style;
(b) responsive to each of said second electrical signals, subtracting from said blood register a weight corresponding to the tare weight of a sponge of said second type.

* * * * *